United States Patent [19]
Ballantyne

[11] 3,824,675
[45] July 23, 1974

[54] METHOD OF MAKING EXTRUDED PANEL AND NUT ASSEMBLY

[75] Inventor: David B. Ballantyne, Southfield, Mich.

[73] Assignee: General Motors Corporation, Detroit, Mich.

[22] Filed: Mar. 14, 1973

[21] Appl. No.: 341,110

Related U.S. Application Data

[62] Division of Ser. No. 154,084, June 17, 1971, abandoned.

[52] U.S. Cl............. 29/445, 29/512, 29/523, 151/41.73
[51] Int. Cl............................................. B23p 9/00
[58] Field of Search ............ 29/512, 523, 522, 445; 151/41.73

[56] References Cited
UNITED STATES PATENTS

| | | | |
|---|---|---|---|
| 1,471,952 | 10/1923 | Ford .................................... | 29/445 |
| 2,254,924 | 9/1941 | Williams............................ | 29/512 X |
| 2,379,804 | 7/1945 | Johnson....................... | 151/41.73 X |
| 3,129,444 | 4/1964 | Kahn................................ | 29/523 X |
| 3,193,857 | 7/1965 | Kahn................................ | 29/523 X |
| 3,282,315 | 11/1966 | Zahodiakin...................... | 151/41.73 |
| 3,282,317 | 11/1966 | Zahodiakin...................... | 151/41.73 |
| 3,381,362 | 5/1968 | Church et al..................... | 29/522 X |

*Primary Examiner*—Charlie T. Moon
*Attorney, Agent, or Firm*—Arthur N. Krein

[57] ABSTRACT

A panel extruding nut for use with a thread forming screw and adapted to be mechanically secured to a flat sheet basal member, the nut including a body having opposed flat surfaces and opposed coaxial first and second bores, the first bore having a diameter slightly larger than the minor diameter of the screw thread, the second bore having a diameter which, together with two extruded or drawn thicknesses of the basal member, is substantially equal to the diameter of the first bore. A punch is used to pierce the basal member and to extrude and shape an integral neck into the second bore which mechanically secures the panel extruding nut. The neck and the panel extruding nut are then threaded by the thread forming screw.

1 Claim, 9 Drawing Figures

PATENTED JUL 23 1974　　　　　　　　　　3,824,675

METHOD OF MAKING EXTRUDED PANEL AND NUT ASSEMBLY

This is a division of U.S. Ser. No. 154,084 filed June 17, 1971, now abandoned.

This invention relates to fasteners and, in particular, to a nut structure for use with a thread forming screw, the nut being adapted to be mechanically secured to a basal member.

In the manufacture of products from sheet metal panels, it is often necessary to releasably attach adjacent panels to each other or to attach other elements to a panel by the use of threaded fasteneras, such as bolts and screws, threaded into suitable nuts secured to one of the panels. In addition to the conventional weld nuts and cage nuts, there are two other types of nuts commonly used for this purpose. One such type of nut is a clinch nut, a threaded, piloted nut which, after insertion in a drilled or punched hole in the sheet metal panel, is clinched or staked in place. The other type of nut is a pierce clinch nut which has a rectangular or round head with a pilot-type projection or center post thereon which pierces its own hole when pressed against a metal panel. Impacted against a die or pressure from the die post, cold forms metal from the panel into an undercut under the nut head to clinch the nut in position on the panel.

Although both clinch nuts and pierce nuts are commonly used, there are certain disadvantages inherent in their use. For example, neither type of nut has suitable holding power in terms of push-off from the panel. Thus, a common fault of these fasteners is the fact that when power tools are used to insert a bolt or screw into the nut, as the bolt or screw is inserted through the panel into engagement with the nut, there is a tendency to frequently dislodge the nut from the panel because of the low push-off strength of these fasteners, leaving the nut free to rotate so that the bit or screw cannot be properly seated. In addition, neither type of nut, when secured to the panel in the conventional manner previously described, has an adequate pull-through strength commensurate with the pull-through strength of the panel itself.

Furthermore, in the case of the common clinch nut, the metal panel must be first handled to drill or punch the holes necessary for insertion of these clinch nuts before they can be assembled thereto.

It is therefore a primary object of this invention to provide a nut type fastener which lends itself to a simple fastening operation for securing it to a sheet metal basal member and which, once thus assembled, has both superior push-off and pull-through strength relative to the panel.

Another object of this invention is to provide a nut type fastener which is adapted for assembly to a sheet metal basal member without the need of a drilled or punched hole prior to assembly to receive the clinch nut fastener.

Still another object of this invention is to provide a panel extruding nut fastener of simple configuration which is adapted to be mechanically fused to a sheet metal basal member, and then, upon the insertion of a thread forming screw therein, has the basal member further cold worked to effect a further mechanical fusion of the clinch nut fastener to the basal member.

These and other objects of the invention are attained by means of a panel extruding nut usable with a thread forming screw and adapted to be mechanically secured to a flat basal member, the nut having a body with at least one flat surface thereon for engagement with the basal member, the body of the clinch nut having a stepped axial bore therethrough forming a thread receiving bore and a basal receiving bore, the thread receiving bore being opposite the flat side of the body member and having a major diameter slightly larger than the minor thread diameter of the screw, the basal receiving bore having a diameter which, together with two extruded or drawn thicknesses of the basal member, is substantially equal to the diameter of the thread receiving bore, the wall of the basal receiving bore being provided with radially inward extending ribs, the internal diameter of which is slightly larger than the major thread diameter of the screw, the surface of the nut adjacent to the basal receiving bore being deformed to project radially inward for engagement by the basal member.

For a better understanding of the invention, as well as other objects and further features thereof, reference is had to the following detailed description of the invention to be read in connection with the accompanying drawings, wherein.

Figure 1:
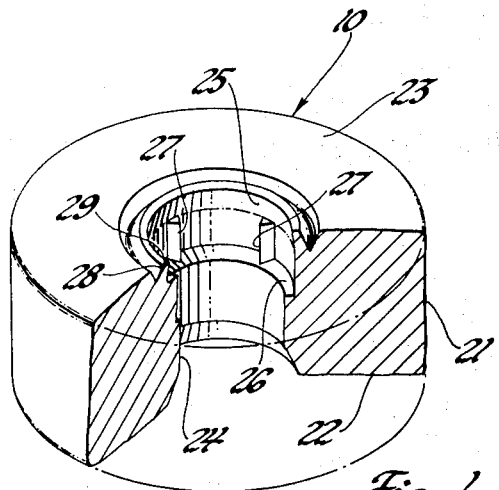
FIG. 1 is a perspective view of an unthreaded panel extruding nut of the invention, with part of the nut being broken away to show its interior.
Figure 4:
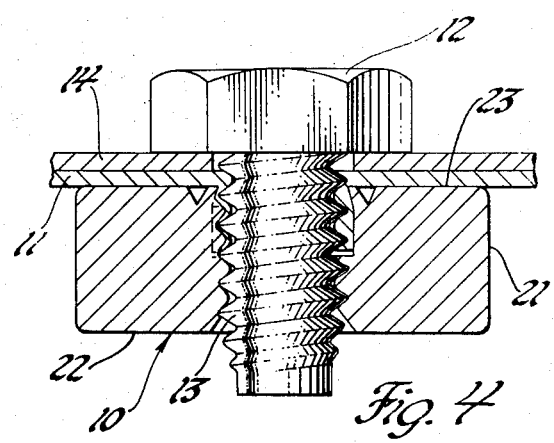
FIG. 4 is a sectional view of a portion of a completed assembly of screw and panel extruding nut used to secure a second member to the basal member.

Referring now to FIGS. 1 and 4, a panel extruding nut 10 is adapted to be secured to a basal member of suitable ductile material, such as a sheet metal plate 11, to receive a thread forming screw 12 used to secure a panel 14 or similar member in juxtaposition to the basal member.

The body of the panel extruding nut 10 of the invention may take any suitable external configuration, such as square, rectangular or other multisided configuration, but preferably, it is a round nut constituted as a body of revolution about an axis with an annular outer surface 21 and opposed flat surfaces 22 and 23. The body is provided at opposite sides with bores 24 and 25 of different sizes meeting coaxially, with a shoulder 26 therebetween, which can be formed at any suitable angle but is shown, for purpose of illustration only, as at right angle to the axes of the body. The bore 24, which prior to assembly to the basal member is unthreaded, can be referred to as a thread receiving bore, the diameter of which is slightly larger than the minor diameter of the screw threads 13 of screw 12, as described in greater detail hereinafter.

The bore 25, which is identified as a basal receiving bore, is preferably at least a partly splined bore with a plurality of spaced apart anti-rotation ribs 27 provided thereby extending radially inward from a wall defining the major diameter of the bore 25 which preferably is at least equal to or larger than the diameter of bore 24 plus two extruded or drawn thicknesses of the basal member 11 to which this nut is to be attached. The minor diameter of bore 25, as defined by the radial inward edges of the ribs 27, is greater than the major outside diameter of the screw threads 15 of screw 12 and, in addition, the radial depth of the ribs is preferably less than the minimum thickness of the basal member 11, all for a purpose to be described. The ribs 27 are preferably triangular in cross section and for ease in forming are preferably longitudinally aligned with the axis of bore 25. The ribs 27, as will become apparent, are used to prevent relative rotation between the nut and the basal member after assembly of these parts.

Figure 2:
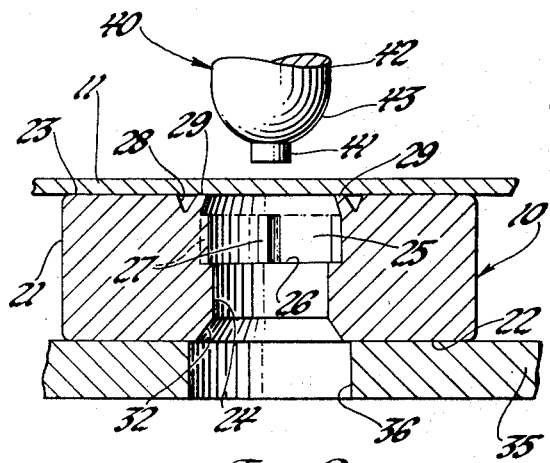
FIG. 2 is a sectional view showing the initial securing of this nut of FIG. 1 to a basal member.

The panel extruding nut 10 is also provided with a swaged, indented or machined annular groove 28 on the surface 23 concentric with bore 25 to provide an annular basal engaging lip 29 extending radially inward of the major diameter of bore 25 and concentric therewith adjacent to surface 23. In the embodiment of the nut illustrated in FIGS. 1 through 4, inclusive, the upper edge of lip 29 is coplanar with the surface 23. Thus, the panel extruding nut in its manufactured form prior to assembly to a basal member is as just described and as illustrated in FIG. 1. In use, the panel extruding nut 10 is first secured to a basal member, as shown in FIGS. 2 and 3, before the threads are formed therein, for a purpose that will become apparent.

The panel extruding nut, in order to be secured to the basal member, is posistioned with its face 22 supported by a back-up anvil 35 with a suitable anvil opening 36 therein, the nut being positioned concentric with the opening 36, and then, the basal member 11 is positioned over the nut with the basal member adjacent to the surface 23 of the nut. A suitable punch is then used to pierce the basal member and to extrude or draw the ductile material of the basal member downward, in terms of FIGS. 2 and 3, to form a depending collar on the basal member which is mechanically locked to the nut.

As shown, the punch 40, preferably includes a piercing tip 41 of a suitable diameter and an extrusion punch portion 42 of a suitable diameter, as described in detail hereinafter, but of a diameter to permit its entry into bore 24 of the nut, and it includes a punch nose 43 intermediate therebetween. The punch 40 is used in a suitable press, not shown, to pierce the basal member and to extrude or draw a portion thereof to form an integral sleeve or neck 15 which is initially lightly, mechanically secured to the nut 10.

Figure 3:
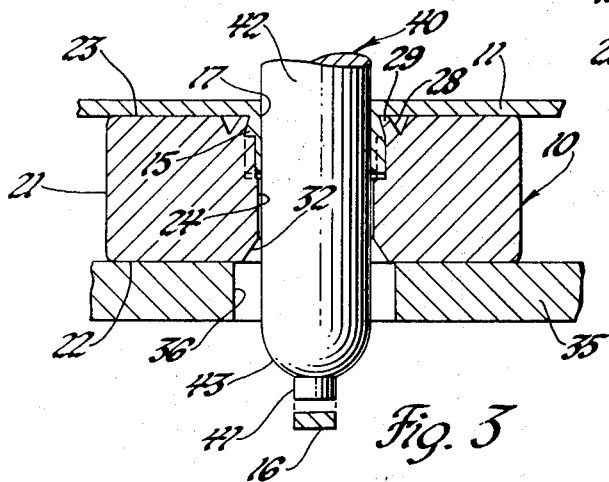
FIG. 3 is a sectional view showing the nut of FIG. 1 as it is initially secured to a basal member with a portion of the basal member punched and extruded or drawn into engagement with the nut.

As seen in FIG. 3 when the punch is forced downward with reference to this figure, the piercing tip 41 of the punch 40, which tip should preferably be of a diameter exceeding the thickness of the basal member, punches out a small slug 16 of the basal member 11, as seen in this figure, which drops through the anvil opening 36. Then the punch 40, as it descends, will have the punch nose 43 engaging the basal member material to extrude or draw it downward into the bore 25 with this material being thinned out and swaged under the lip 29, as seen in FIG. 3, to thereby secure the panel extruding nut to the basal member and provide an axial lock therewith. The metal of the basal member is also extruded or drawn and simultaneously wholly or partially swaged around the ribs 27 to thus secure the panel extruding nut against rotation with respect to the neck 15 of the basal member. In addition, the extrusion punch portion 42 of the punch 40 is of a suitable diameter, as described hereinafter, to properly size the internal diameter of the hole 17 in the turned down neck 15 so that it corresponds substantially to the diameter of bore 24. Thus, during the die punch operation, the metal forming the neck 15 is cold worked to effect an extrusion or drawing out and thinning of the material of the basal member to form a collar or neck 15 of a length greater than permitted by the thickness of the basal member, if this material was not drawn or extruded, and in addition, effecting a mechanical bond between the panel extruding nut and the basal member. In addition, this punch operation forms an extruded hole 17, the inside surface of which is smooth and accurately sized, for the intended purpose, by the punch 40.

A thread forming screw 12 is preferably used to form the internal threads in the neck 15 and in the bore 24 of the panel extruding nut 10 because thread cutting screws and thread cutting taps would cut away so much of the thin wall of the extruded neck 15 so that the strength of this portion of the assembly would be impaired, whereas with the use of a thread forming screw, there is no appreciable loss of material during the thread forming operation. However, more importantly, a thread forming screw is used because, when forming or rolling these threads in the neck 15, there is effected a further cold working of the material of the neck 15 to further increase the mechanical bonding of this material to the panel extruding nut. Thus, when the thread forming screw 12 is threaded from the basal member side of this assembly through the hole 17 in the basal member 11, it will first form internal threads in the material of the neck 15, this being the further cold working of this material, and then thereafter the threads are formed in the bore 24 portion of the panel extruding nut 10.

Actual cold working is effected both on the material of the neck 15 and in the bore 24 of the nut, because with this type of thread forming screw, there is effected a roll forming of the mating threads in the previously unthreaded pilot holes, that is, hole 17 in the neck 15 and bore 24 in nut 10. The thread forming screw 12, also commonly referred to as a thread rolling screw, may be of the general type of screws as disclosed in U.S. Pat. No. 3,195,156 issued July 20, 1965 to Harvey F. Phipard, Jr. As is well known in the art, the bore or pilot hole size in the material in which the threads are to be formed by this type of screw can be sized, as desired, to provide any desired percentage of thread up to 100 percent, these screws normally giving best performances with thread engagement of 60 percent or greater.

In view of the above, it is obvious that for a given screw size, such as for example, for a 5/16 inch thread forming screw with 18 threads per inch, the internal diameter of the pilot hole or bore 24 in the panel extruding nut 10 is preselected to give the desired theoretical percentage of screw thread engagement, that is, for a 75 percent theoretical thread engagement, the pilot hole or bore 24, in this example, would have a diameter of approximately 0.285 inch.

Referring now to the major internal diameter of bore 25 of the panel extruding nut 10, it is now apparent that for a given percentage of desired thread engagement, these panel extruding nuts of the invention can be manufactured with different major diameters of the bore 25 so that with the material of the basal member drawn or extruded therein, any desired percentage of screw thread engagement can be effected. But, in addition, bore 25 can also be sized for each different gauge or thickness of the basal member to which these nuts are to be attached. However, this last mentioned sizing of the bore 24 for different gauges or thicknesses of the basal member is not absolutely necessary while still permitting the formation of the desired percentage of thread engagement, since it has been found that these panel extruding nuts of the invetnion, with a given predetermined diameter size of bore 25 and for a given punch diameter can be used to accommodate a selected range of gauge or thickness in basal members. This is because the panel extruding nut of the invention acts as a die member which cooperates with the punch, to effect the desired extrusion or drawing of the basal member material to effect proper sizing of collar or neck 15.

Thus, as by way of example and still using the above-identified 5/16 inch thread forming screw and 75 percent thread engagement, it has been found that panel extruding nuts, all with a given size bore as described hereinafter, can be adequately secured to different basal members ranging in thickness from say 0.059 inch to 0.087 inch. In this example, the 5/16 inch thread forming screw had a major diameter of 0.318 inch and a minor diameter of 0.244 inch. As previously described, these panel extruding nuts were provided with a bore 24 of 0.285 inch diameter while the bore 25 therein had a major diameter of 0.430 inch and a minor diameter of 0.360 inch, the depth of the ribs being 0.035 inch. It was found that this depth for the ribs 27 was sufficient to permit these ribs to engage the metal of the neck 15 during the punch and drawing or extruding process. This depth for the ribs 27 is sufficiently less than the thickness of the extruded or drawn metal forming the neck 15 to thereby prevent breakthrough of these ribs 27 through the metal of the neck 15. Because of the predetermined diameter of the bore 24, as described above, the diameter of the extrusion punch portion 42 of punch 40 was selected so that the internal diameter of the downturned neck 15, after the punching and extrusion process, which diameter was determined by this portion of the punch, was 0.283 inch, this diameter thus being slightly smaller than the internal diameter of bore 24 prior to the thread forming operation therein.

After the 5/16 inch thread forming screw 12 was threaded through the neck portion 15 of the basal member and the bore 24 of the panel extrusion nut, the internal minor diameter of the neck 15 was approximately 0.262 inch for both a 0.059 inch and a 0.087 inch thick basal member. It is thus apparent that even though different size basal members were used in the above example, that further cold working of the material forming the neck 15 is effected when the screw threads are formed therein and that this further cold working will act to further increase the mechanical bond between the basal member and the panel extruding nut.

In the above referred to example, the internal diameter of the lip 29 of the panel extruding nut 10 was 0.380 inch, a diameter which, in comparison to the outside diameter of the extruding punch portion 42 of portion 40, and the minimum thickness of 0.059 inch for the basal member used, will still cause the material of the basal member to be extruded and drawn by the punch 40 around the lip 29 and to be partly swaged underneath it to provide an effective axial lock between the basal member and the panel extruding nut 10.

Again for purposes of disclosure only and for use with a 5/16 inch threaded forming screw when using thinner gauge basal members, for example, in the range of 0.041 inch to 0.059 inch in thicknesses, satisfactory mechanical bonding between the panel extrusion nuts 10 and these basal members were effected using nuts having a bore 25 with a major diameter of 0.370 inch and a minor diameter of 0.300 inch, the depth of the ribs 27 thus being 0.035 inch. With these nuts, the internal diameter of the lip 29 was 0.325 inch which again, with the minimum thickness of the basal members used in this example, still permits the material of the basal member to be extruded by the punch around this lip 29 and to be swaged underneath it to provide an effective axial lock between the basal member and the panel extruding nut 10.

It can be seen from the above example, that the panel extruding nut during the punching operation acts as a suitable die to effect proper extrusion and drawing of the material of the basal member to form the collar 15 but, in addition, unlike in the use of a conventional die, these nuts are mechanically bonded to the basal member during the punching operation.

Although better control of the material of the basal member can be effected during the punching operation when a hole is first pierced in the basal member by the removal of a slug 16 therefrom, as previously described, it is apparent that a punch without a piercing tip can be used to effect a similar piercing and drawing operation on this material, but this is less desirable since it leads to unpredictable fractures in the material and, of course, under these circumstances, would require that the depth of the bore 25 be greater than one-half the diameter of the internal diameter of the neck 15 thus formed from the basal member. On the other hand, with the use of a punch with a piercing tip, sufficient material can be removed by the slug 16 so that the depth of the bore need not be as extensive, just being sufficiently deep enough to accommodate the extruded or drawn neck 15.

Figure 5:
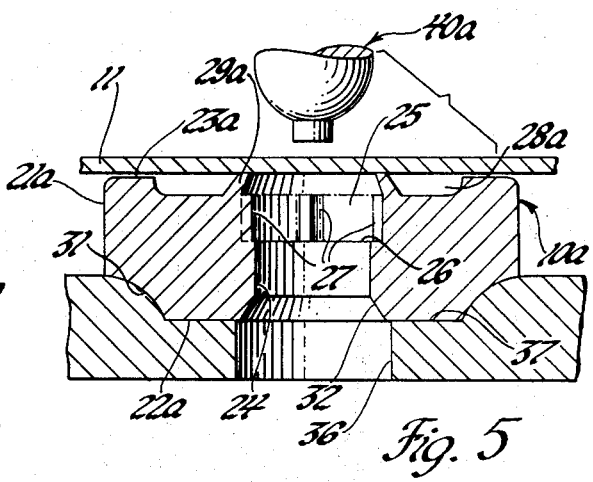
FIG. 5 is a sectional view similar to FIG. 2 illustrating a modified form of the nut of the invention.
Figure 6:
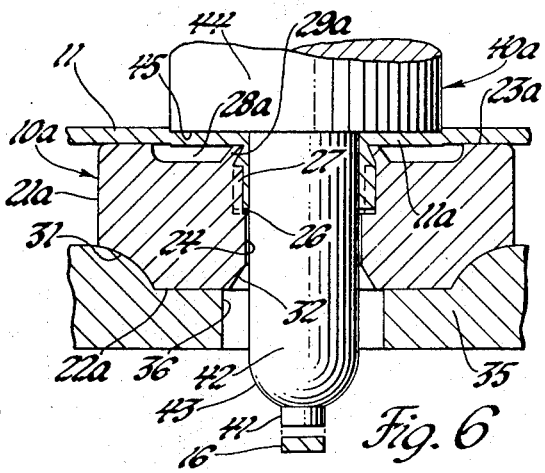
FIG. 6 is a view similar to FIG. 3, showing the modified nut of FIG. 5 secured to the basal member.

Referring now to the embodiment of the panel extruding nut illustrated in FIGS. 5 and 6, wherein like parts are identified with like reference characteristics to that of the embodiment previously described, this panel extruding nut 10a is also preferably constituted as a body of revolution about an axis with an outer surface 21a and opposed surfaces 22a and 23a. The body is provided at opposite sides with thread receiving bore 24 and a basal receiving bore 25, each of different size, as previously described with reference to the embodiment of FIGS. 1 through 4, meeting at a shoulder 26.

The bore 25 is a partly splined bore with a plurality of spaced apart anti-rotation ribs 27 therein extending radially inward from a wall defining the major diameter of the bore 25.

In this embodiment, the panel extruding nut 10a is provided with a suitably formed, enlarged annular groove 28a encircling the portion of the nut material forming an annular basal engaging lip 29a which preferably is so angled as to extend slightly radially inward off the major diameter of bore 25 and above the plane of the surface 23a, as seen in FIG. 5. With this arrangement, during the punching and extruding or drawing operation on the basal member, as previously described, the lip 29a can be turned further radially inward, with the material of the nut beneath lip 29a being movable in part into the cavity provided by annular groove 28a.

When using panel extruding nuts 10a, a punch 40a should be used during the punching operation. As shown in FIG. 6, punch 40a preferably includes a piercing tip 41, an extrusion punch portion 42 with a punch nose 43 therebetween, and a backup portion 44 to the extrusion punch portion 42 providing a coining shoulder 45. As seen in FIG. 6, during the punching operation, the shoulder 45 of punch 40a will engage and depress a corresponding area 11a of the basal member 11 beneath it and force this material against the lip 29a and, because the lip 29a is already angled radially inward, it will be deflected slightly further radially inward to the position shown, with an undepressed portion of the basal member 11 now in engagement with surface 23a of nut 10a.

Preferably, as shown in the embodiment of FIGS. 5 and 6, the nuts are provided with a suitable index edge such as concave, annular, index edge 31 adjacent the outer surface 21a and surface 22a to serve as an index to be sensed in an automatic feeding apparatus, not shown, whereby these nuts can be automatically fed to and positioned on the anvil 35 with the surface 22a down on the anvil. In addition, the index edge 31 can be used, if desired, in a complementary formed anvil depression 37 in the anvil 35 to effect centering of the nut beneath the die punch 40a as shown in FIGS. 5 and 6.

Alternately, as shown in both embodiments of the nut, the thread receiving bore 24 can be countersunk to provide a conical guide edge 32 to effect locating and centering of these nuts as by means of a complementary-shaped movable centering pin, not shown, which can be moved from the back of the anvil 35 through the anvil opening 36 into engagement with the nut and to hold it in place while the basal member is located on the nut, after which it is moved out of engagement with the nut prior to operation of the die punch. In addition, a flat anvil, as in FIGS. 2 and 3, can be used with either a nut 10 or a nut 10a positioned thereon in correct relation to either the punch 40 or punch 40a by means of suitable well-known gripping or indicator jaws, not shown, since they form no part of the subject invention.

Figure 7:
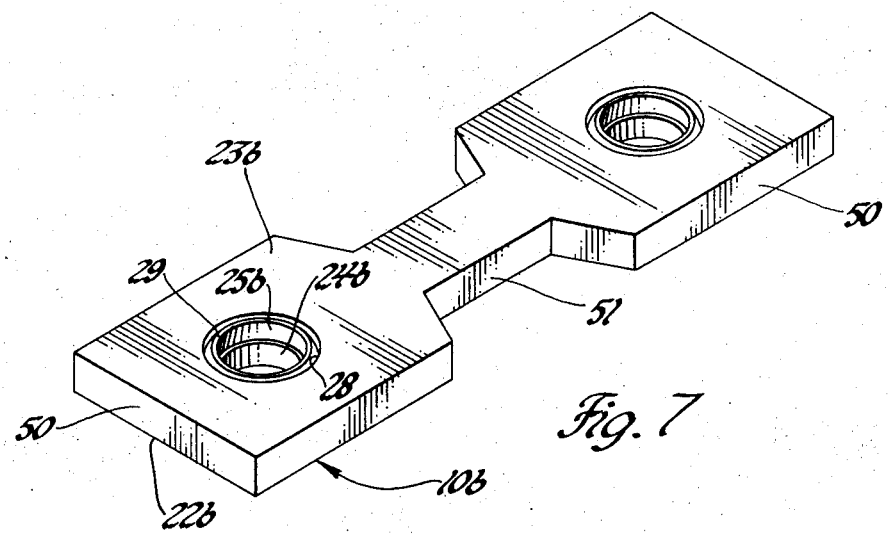
FIG. 7 is a perspective view of another embodiment of a panel extruding nut having multiple panel receiving apertures therein.

In certain applications, several fasteners may be used in closely spaced relation to each other but, rather than using a plurality of separate panel extrusion nuts in such a location, an anchor plate in the form of a panel extrusion nut having two or more extrusion apertures therein may be used. Such a panel extrusion nut is shown in the embodiment illustrated in FIGS. 7, 8 and 9. As shown in these figures, nut 10b, which may be of any suitable configuration, is in essence a plurality of nuts, two in the embodiment shown, formed integral in a single nut body.

In the embodiment shown, the body of the nut 10b includes a pair of nut body portions 50 connected together by a reduced neck portion 51 formed integral therewith, with opposed surface 22b and flat surface 23b, the surface 22b including depending bosses 52.

Each nut body portion 50 is provided with bores 24b and 25b, similar to previously described bores 24 and 25, respectively, except that basal receiving bore 25b need not be a partially splined bore since the anti-rotation ribs 27 are not required. This is because two or more basal receiving bores in a nut body will provide for automatic anti-rotation after the necks 15 of the basal member have been extruded into the basal receiving bores 25b to prevent relative rotation between nuts 10b and the basal member. Panel extruding nut 10b is also provided with a swaged, indented or machined annular groove 28 on the surface 23b concentric with each bore 25b to provide basal engaging lips 29 for a purpose previously described.

Figure 8:
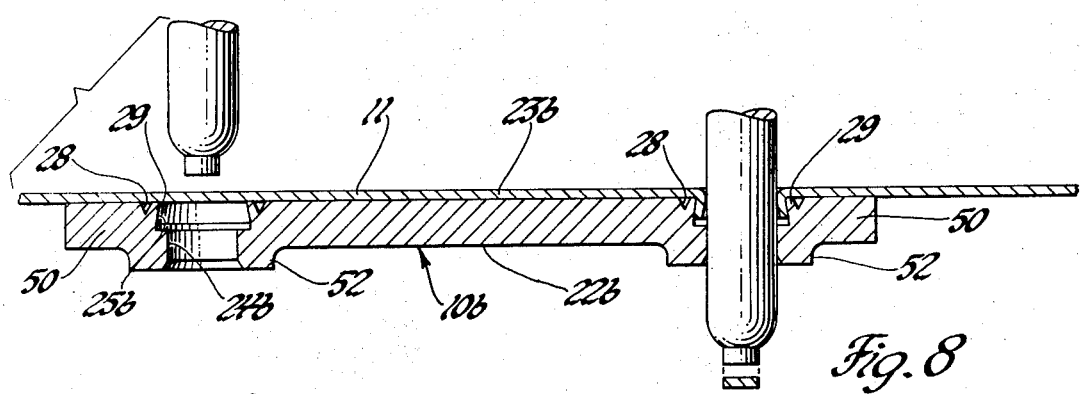
FIG. 8 is a sectional view of the nut of FIG. 1 showing the initial securing of this nut to a basal member with a portion of the basal member punched and extruded or drawn into engagement with one portion of the nut; and, FIG. 9 is a sectional view of a portion of a completed assembly of screw, panel extruding nut of FIG. 7 and basal member to secure a second member to the basal member.
Figure 9:
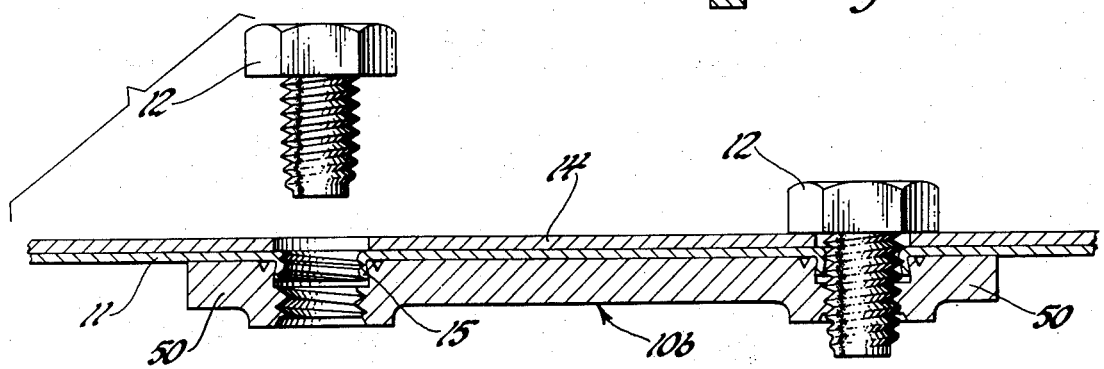

Panel extruding nut 10b, as shown in FIGS. 8 and 9, is then assembled to the basal member 11 and then to a panel 14 in a manner similar to that previously described with reference to FIGS. 2, 3 and 4.

What is claimed is:

1. In a method of making a plate metal product having a threaded receptacle projecting integrally from one surface of the product, the steps of providing a metal plate having top and bottom surfaces and a nut having a first surface and a second surface on opposite sides thereof and having a pair of bores of different sizes therethrough, one smaller than the other, said bores meeting coaxially with an intervening shoulder and an annular lip adjacent to the first surface and positioned concentric with said bores and extending radially inward with respect to the larger of said bores, positioning said nut with its first surface in engagement with said bottom surface of said metal plate, extruding from said metal plate a depending tubular sleeve having inner and outer concentric surfaces with said outer surface mechanically bonded to said annular lip of said nut and extending into the larger of said bores of said nut and bonded thereto, roll forming an internal thread first in said tubular sleeve and then in the smaller of said bores of said nut to further cold work said tubular sleeve to increase the mechanical bond between the said tubular sleeve and said nut.

* * * * *